Patented Nov. 8, 1949

2,487,110

UNITED STATES PATENT OFFICE 2,487,110

PREPARATION OF 1-AMINO-4-HYDROXY-5-CHLOROANTHRAQUINONE

Joseph Deinet, Glassboro, N. J., and Frederic B. Stilmar, Wilmington, Del., assignors to E. I. du Pont de Nemours & Company, Wilmington, Del., a corporation of Delaware No Drawing. Application June 5, 1947,
Serial No. 752,828

2 Claims. (Cl. 260—380)

1

This invention relates to an improved process for the preparation of 1-amino-4-hydroxy-5-chloroanthraquinone.

1-amino-4-hydroxy-5-chloroanthraquinone, which is a valuable intermediate for the preparation of vat dyes, has previously been prepared by the nitration of 1-hydroxy-8-chloroanthraquinone or by treating 1-chloro-5-nitroanthraquinone with sulfur sesquioxide, but neither of these methods is economically satisfactory for the production of this valuable intermediate on a commercial scale.

It is an object of this invention to provide a process for the preparation of 1-amino-4-hydroxy-5-chloroanthraquinone in high yields and purity and which is suitable for the commercial preparation of this intermediate on a scale which makes the intermediate of practical use in the preparation of anthraquinone vat dyes.

We have found that 1-amino-4,5-dichloroanthraquinone can be selectively hydrolyzed to the 1-amino-4-hydroxy-5-chloroanthraquinone when it is heated with concentrated sulfuric acid at temperatures of above 140° C. in the presence of boric acid. Under these conditions the chlorine in the 4-position is selectively hydrolyzed and replaced by the hydroxyl group, resulting in the formation of the 1-amino-4-hydroxy-5-chloroanthraquinone of high purity and in good yields. Alternatively, the 1-nitro-4,5-dichloroanthraquinone, from which the 1-amino-4,5-dichloroanthraquinone is originally obtained, may be treated with a reducing agent, such as iron powder or tetrahydronaphthalene, at temperatures above 140° C. (preferably at 150° C.) in sulfuric acid and in the presence of boric acid, whereby the nitro group is reduced to the amino group and the chlorine in the 4-position is simultaneously replaced by the hydroxyl radical.

The following examples are given to illustrate the invention. The parts used are by weight, unless otherwise specified.

Example 1

300 parts of 1-amino-4,5-dichloroanthraquinone, 150 parts of boric acid and 3000 parts of sulfuric acid monohydrate are heated at 150°–155° C. for 5 hours. The progress of the reaction is readily followed by the fact that test portions drowned in water change from red to violet as hydrolysis proceeds. The reaction mass is then cooled and gradually diluted with water to a 70% sulfuric acid concentration. The sulfate of the 1-amino-4-hydroxy-5-chloroanthraquinone is fil-

2 tered off, washed with 70% sulfuric acid and then with water until free from acid.

1-amino-4-hydroxy-5-chloroanthraquinone is obtained in a yield of 216 parts. It contains 13.0% Cl (theory=13.0%), 4.92% nitrogen (theory=5.1%) and has a melting range of 270°–275° C.

Example 2

50 parts of 1-nitro-4,5-dichloroanthraquinone, 25 parts of boric acid and 500 parts of 96% sulfuric acid are heated to 150°–155° C. under agitation. 25 parts of iron powder are added over two hours, and the sulfuric acid solution filtered on a (sintered) glass funnel to get rid of insoluble iron salts. The sulfuric acid filtrate, upon gradual dilution with water to 70% acid concentration, deposits the sulfate of 1-amino-4-hydroxy-5-chloroanthraquinone in pure form. This is worked up as in Example 1, giving the product melting at 273°–276° C. in a yield of 28 parts.

Sulfuric acid of from 93% to 100% concentration (monohydrate) may be employed in carrying out the above reaction. While temperatures of 150°–155° C. are particularly preferred, the reactions may be satisfactorily carried out at temperatures of from 140°–160° C. At higher temperatures certain side reactions tend to take place, and therefore it is preferred to carry out the reaction at temperatures of not above 160° C. The 1-amino-4-hydroxy-5-chloroanthraquinone readily forms the surface in sulfuric acid of around 70% concentration and it is preferred to use this concentration of acid in the isolation or purification of this product. Other metal powders, such as copper, tetrahydronaphthalene, or other reducing agents which operate in acid solution, may be employed in effecting the combined reduction and hydrolysis of the 1-nitro-4,5-dichloroanthraquinone to the 1-amino-4-hydroxy-5-chloroanthraquinone. The amount of boric acid may be varied from one-half to one part per part of 1-amino(or nitro)-4,5-dichloroanthraquinone.

Where the reaction is carried out under conditions at which a product of lower purity than that particularly specified in the above examples is obtained, it may be purified by dissolving in concentrated sulfuric acid and precipitating it as the sulfate by diluting the acid to 70% concentration and then filtering and washing the resulting product with water until free from acid. The product may also be purified by recrystallization from solvents, if desired.

1-amino-4-hydroxy-5-chloroanthraquinone is a valuable intermediate for the preparation of various vat dyes, since it may be acylated, alkylated and condensed with amino compounds, particularly through the chlorine in the 5-position.

1-amino-4-hydroxy-5-chloroanthraquinone may also be used as a dye for acetate silk, giving attractive red-violet shades.

We claim:
1. In the process for preparing 1-amino-4-hydroxy-5-chloroanthraquinone, the step which comprises heating 1-amino-4,5-dichloroanthraquinone in concentrated sulfuric acid of from 93% to 100% in the presence of boric acid at temperatures of from 140° to 160° C.

2. The process for preparing 1-amino-4-hydroxy-5-chloroanthraquinone, the step which comprises heating 1-nitro-4,5-dichloroanthraquinone in concentrated sulfuric acid of from 93% to 100% in the presence of a reducing agent and boric acid to simultaneously effect reduction of the nitro group and hydrolysis of the chlorine in the 4-position, isolating the resulting 1-amino-4-hydroxy-5-chloroanthraquinone by diluting the sulfuric acid to aproximately 70% concentration, filtering off the resulting sulfate of the 1-amino-4-hydroxy-5-chloroanthraquinone and washing it acid-free with water.

JOSEPH DEINET.
FREDERIC B. STILMAR.

REFERENCES CITED

The following references are of record in the file of this patent:

UNITED STATES PATENTS

| Number | Name | Date |
|---|---|---|
| 2,134,654 | Lulek | Oct. 25, 1938 |

FOREIGN PATENTS

| Number | Country | Date |
|---|---|---|
| 298,696 | Great Britain | Oct. 18, 1938 |
| 203,083 | Germany | Oct. 10, 1908 |
| 481,362 | Germany | Aug. 21, 1929 |

OTHER REFERENCES

Waldmann et al: Jour. prakt. Chem., vol. 150 (1938) pp. 107 to 112.

Houben: Das Anthracen und die Anthrachinone (1929) p. 310.

Certificate of Correction

Patent No. 2,487,110 November 8, 1949

JOSEPH DEINET ET AL.

It is hereby certified that errors appear in the printed specification of the above numbered patent requiring correction as follows:

Column 2, line 32, for "surface" read *sulfate*; column 3, line 15, strike out the comma and words ", the step";

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*